United States Patent [19]

Bamettler

[11] 4,039,202
[45] Aug. 2, 1977

[54] TRAILER PIN LATCH PLATES

[75] Inventor: Rudy A. Bamettler, South San Francisco, Calif.

[73] Assignee: The Raymond Lee Organization, Inc., New York, N.Y.; a part interest

[21] Appl. No.: 644,604

[22] Filed: Dec. 29, 1975

[51] Int. Cl.$^2$ ................................ B60D 1/00
[52] U.S. Cl. ................................ 280/507; 70/232
[58] Field of Search ............ 280/432, 507; 70/229, 70/231, 232

[56] References Cited

U.S. PATENT DOCUMENTS

| | | | |
|---|---|---|---|
| 1,329,913 | 2/1920 | McGuire | 70/232 X |
| 2,554,306 | 5/1951 | Mack | 280/507 X |
| 2,785,564 | 3/1957 | Rossi | 70/232 |
| 3,269,159 | 8/1966 | Young | 280/507 X |

Primary Examiner—Robert R. Song
Assistant Examiner—R. Schrecengost
Attorney, Agent, or Firm—Howard I. Podell

[57] ABSTRACT

A pair of plates, rotatably joined together on the underside of a trailer or semi-trailer, which in the latched position enclose the trailer pin so as to prevent a tractor from being joined to the fifth wheel of a tractor. The plates, when in the latch position, may be fastened by key locking or other latching means. Opening of the plates permits access of a tractor fifth wheel to the trailer pin.

2 Claims, 5 Drawing Figures

TRAILER PIN LATCH PLATES

SUMMARY OF THE INVENTION

My invention is a pair of plates, rotatably joined together on the underside of a trailer or semi-trailer, which in the latched position enclose the trailer pin so as to prevent a tractor from being joined to the fifth wheel of a tractor. The plates, when in the latch position, may be fastened by key locking or other latching means. Opening of the plates permits access of a tractor fifth wheel to the trailer pin.

By means of my invention, a trailer can be secured from attachment to the tractor so as to prevent unauthorized removal of the trailer.

BRIEF DESCRIPTION OF THE DRAWINGS:

The objects and features of the invention may be understood with reference to the following detailed description of an illustrative embodiment of the invention, taken together with the accompanying drawings in which.

Figure 1:
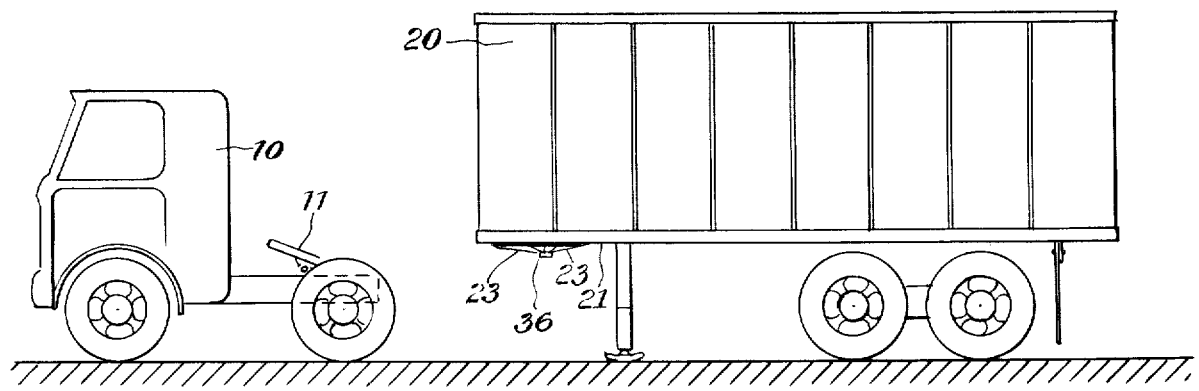
FIG. 1 is a view of a tractor and a detached trailer equipped with the invention.
Figure 2:
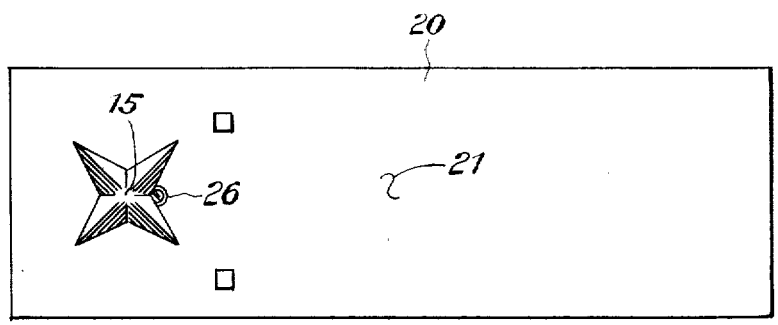
FIG. 2 is a bottom plan view of the installed invention.
Figure 5:
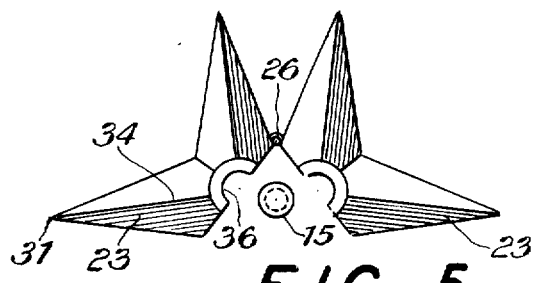
FIG. 5 is a bottom plan view of the invention in the partially open position.

DESCRIPTION OF THE PREFERRED EMBODIMENT:

Turning now descriptively to the drawings, in which similar reference characters denote similar elements throughout the several views, FIG. 1 illustrates a tractor 10 equipped with a fifth wheel 11 which is shaped to matingly engage a trailer pin 15, shown in FIG. 5, on the underside 21 of a trailer 20, as shown in FIG. 2, when the tractor is attached to the trailer. The trailer pin 15 of trailer 20 is enclosed by a pair of shaped latch plates 23 rotatably mounted by a pivot pin 26 to the underside 21 of the trailer 20 to prevent trailer pin 15 from coming into contact with the fifth wheel of a tractor if the tractor is backed up under the trailer.

Figure 4:
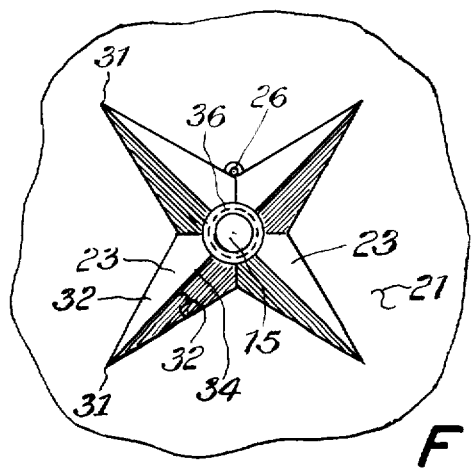
FIG. 4 is a bottom plan view of the invention in the latch position.

Latch plates 23 are each shaped with a pair of pointed ends 31 that are formed by the ends of tapered side sections 32 that extend from the underside 21 of the attached trailer, with each pair of adjacent side sections 32 joined to a common ridge line 34 that extends from a pointed end 31 and rises away from the attached trailer underside 21 to join a circular flange section 36 which is shaped to fit over the head of the trailer pin 15 when the pair of latch plates 23 are pivoted so as to lie adjacent each other as shown in FIG. 4. Pivoting of both latch plates 23 away from trailer pin 15 as shown in FIG. 5, exposes the trailer pin 15 and the latch plates 23 may be further pivoted away from each other to enable a tractor fifth wheel 11 to engage the trailer pin 15.

Alternately, flange 36 of each latch plate 23 may be shaped to fit under the head and about the shank of a trailer pin 15 when the two plates 23 are joined together in the latch position.

Figure 3:
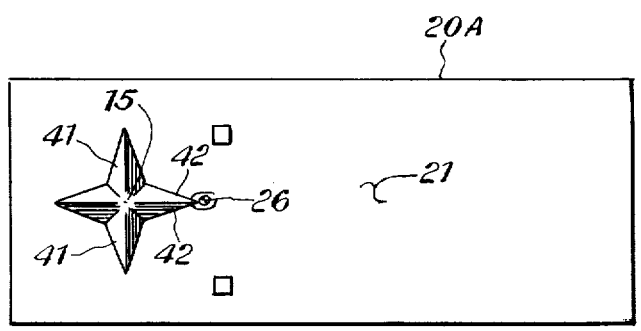
FIG. 3 is a bottom plan view of an alternate embodiment of the installed invention.

An alternate embodiment of the invention is shown in FIG. 3 in which two latch plates 41 are each pivoted at an end point 42 of the plates 41 to the underside 21 of a trailer 20A.

Each latch plate 23 or 41 may be fitted with a locking mechanism for retaining two plates in the latched position so that a key may be employed to lock the latch plates in the latch position.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secire by Letters Patent of the United States is:

1. A pair of hinged plates mounted to the underside of a trailer or semi-trailer by pivot means, said plates shaped so as to surround the tractor attachment pin of said trailer when pivoted to a first position, and said plates shaped so as to clear the tractor attachment pin when pivoted to a second position.

2. The combination as recited in claim 1 together with locking means for retaining the hinged plates in the first position.

* * * * *